United States Patent [19]

Sauer

[11] Patent Number: 4,486,034

[45] Date of Patent: Dec. 4, 1984

[54] SLEEVE COUPLING FOR HOSES OR THE LIKE

[75] Inventor: Heinz Sauer, Ronneburg, Fed. Rep. of Germany

[73] Assignee: Rasmussen GmbH, Maintal, Fed. Rep. of Germany

[21] Appl. No.: 411,990

[22] Filed: Aug. 26, 1982

[30] Foreign Application Priority Data

Sep. 11, 1981 [DE] Fed. Rep. of Germany ....... 3136018

[51] Int. Cl.³ ............................................. F16L 33/22
[52] U.S. Cl. .................................... 285/242; 285/319
[58] Field of Search ............... 285/319, 256, 265, 239, 285/DIG. 22, 242, 244, DIG. 7, 340, 374; 138/109

[56] References Cited

U.S. PATENT DOCUMENTS

| 1,965,426 | 7/1934 | Nelson | 285/257 |
| 2,077,869 | 4/1937 | Bennett | 285/257 X |
| 2,336,656 | 12/1943 | Van Uum | 285/319 |
| 2,550,591 | 4/1951 | Parsons | 285/319 |
| 4,226,446 | 10/1980 | Burrington | 285/256 |

FOREIGN PATENT DOCUMENTS 1547508 11/1968 France ................................ 285/256

*Primary Examiner*—Dave W. Arola
*Attorney, Agent, or Firm*—Peter K. Kontler

[57] ABSTRACT

A sleeve coupling for hoses wherein an end portion of the hose is expanded radially and slipped over an end portion of a rigid tube having one or more external ribs, and the end portion of the hose is surrounded by a metallic clamping sleeve having axially extending resilient prongs surrounding the rib or ribs and provided with U-shaped end portions which pinch the end portion of the hose inwardly of the rib or ribs. A circumferentially complete portion of the clamping sleeve surrounds the hose in a region outwardly of the rib or ribs, and the tips of U-shaped end portions of the prongs abut against the inner side of the innermost rib on the tube.

20 Claims, 6 Drawing Figures

SLEEVE COUPLING FOR HOSES OR THE LIKE

CROSS-REFERENCE TO RELATED CASES

The sleeve coupling of the present invention is related to sleeve couplings which are disclosed in my copending U.S. patent applications Ser. Nos. 097,964 and 245,186 respectively filed Nov. 28, 1979 and Mar. 18, 1981.

BACKGROUND OF THE INVENTION

The invention relates to improvements in couplings in general, and more particularly to improvements in so-called sleeve couplings which can be utilized to establish a fluid-tight connection between a pair of tubular members, especially between a rigid or substantially rigid tubular member and a flexible tubular member. For example, the rigid tubular member can constitute a piece of metallic pipe or tube, and the flexible tubular member can constitute an elastic hose.

It is already known to provide the external surface of one end portion of a rigid tube with a circumferentially extending rib and to slip one end portion of a hose over the rib so that the hose surrounds a substantial part of the external surface. The dimensions of the tube and hose are normally selected in such a way that, prior to its expansion, the outer diameter of the hose exceeds the maximum diameter of the rib and the inner diameter of the hose is smaller than the outer diameter of the tube in the region of establishment of sealing engagement between the tube and the hose, namely, at one or more locations other than that taken up by the rib. The expanded hose is held against slippage off the tube by a clamping sleeve which is provided with an annulus of elastic prongs alternating with slots extending in parallelism with the axis of the sleeve. The sleeve surrounds the expanded portion of the hose and urges the latter against the rib as well as against that portion of the external surface of the tube which is adjacent to and located at the side of the rib facing toward the inserted free end of the tube. Thus, portions of the prongs surround the rib on the tube.

In accordance with a presently known proposal, the clamping sleeve is configured in such a way that the inner diameters of its ends are smaller than the inner diameter of its median portion. Furthermore, the inner diameter at one end of the sleeve is smaller than at the other end. The length of the clamping sleeve, as considered in the axial direction of the coupling, is selected in such a way that the (other) end whose inner diameter is larger surrounds a radially outwardly sloping outer side of the rib and the one end of the sleeve surrounds the hose and urges it against the external surface of the tube in a region which is located inwardly of the rib, namely, in a region which is separated from the concealed free end of the tube by the rib which latter extends radially outwardly from the external surface of the tube. Such design of the clamping sleeve ensures that the sleeve bears against the hose with a rather pronounced force at both ends of the sleeve, i.e., the hose is urged against the exterior of the tube with a pronounced force not only at the one end of the sleeve (namely, the end whose inner diameter is smaller) but also at the other end even though the coupling does not employ any screws, bolts or analogous conventional tensioning devices (such tensioning devices are often impractical because their manipulation contributes to the installation or dismantling time of the coupling). All that is necessary is to slip the clamping sleeve onto the end portion of the hose before such end portion is slipped onto the end portion of the tube whereby that end portion of the sleeve whose inner diameter is smaller travels over and beyond the rib.

A drawback of the just described conventional sleeve coupling is that, if the pressure in the interior of the coupling rises beyond a certain value (e.g., if the pressure of a gaseous or hydraulic fluid flowing through the tube and through the hose rises beyond a given limit), the hose is expanded radially outwardly and ultimately slides off the end portion of the tube as soon as the axial components of forces developing during radial expansion of the hose overcome the frictional engagement between the internal surface of the hose and the external surface of the tube. Radial expansion of the hose takes place in a region which is adjacent to the hose portion that is surrounded by the clamping sleeve. Once the end portion of the hose begins to slip along the external surface of the tube, the separation progresses rather rapidly and the axial movement of the hose relative to the tube is shared by the clamping sleeve since the latter is not in direct engagement with the tube.

OBJECTS AND SUMMARY OF THE INVENTION

An object of the invention is to provide a novel and improved sleeve coupling which ensures retention of a radially expanded hose or another deformable tubular member on a metallic tube or another rigid tubular member under circumstances when a conventional coupling cannot withstand the separation of the two tubular members.

Another object of the invention is to provide a sleeve coupling which is just as simple and inexpensive as heretofore known sleeve couplings but is much more reliable because it can resist greater forces tending to separate the two tubular members.

A further object of the invention is to provide a novel and improved clamping sleeve for use in a coupling of the above outlined character.

An additional object of the invention is to provide a novel and improved configuration of the rigid or substantially rigid tubular member which forms part of the improved coupling.

Still another object of the invention is to provide a sleeve coupling which can be used not only as an effective means for preventing unintentional separation of two partially telescoped tubular members but also as a means for establishing a fluidtight seal between such tubular members.

Another object of the invention is to provide a novel and improved method of establishing a sealing connection between a rigid and a deformable tubular member.

An additional object of the invention is to provide a sleeve coupling which is constructed and assembled in such a way that its resistance to separation of the tubular components increases in response to increasing pressure in the interior of the tubular members.

Still another object of the invention is to provide a sleeve coupling wherein the clamping sleeve can directly engage the rigid tubular member and wherein the clamping sleeve prevents penetration of confined fluids to regions where the fluids could cause a reduction of frictional engagement between the tubular members.

The invention is embodied in a coupling which comprises an at least substantially rigid first tubular member having a first free end and an external surface provided with at least one circumferentially extending rib, an at least partially deformable second tubular member surrounding the external surface of the first tubular member and having a second free end spaced apart from the first free end so that the rib or ribs are disposed between the two free ends and the rib or ribs are spaced apart from the second free end, and a clamping device including a circumferentially complete tubular portion tightly surrounding the second tubular member and an annulus of elastic prongs which are at least substantially parallel to the axis of the first tubular member and surround the second tubular member in the region of the rib or ribs as well as in the region between the rib or ribs and the second free end. The prongs have substantially U-shaped end portions which confine and clampingly engage the second tubular member in the region of the second free end. The dimensions of the second tubular member (prior to expansion which is needed to slip the second tubular member over the first tubular member) are preferably selected in such a way that the outer diameter of the second tubular member is greater than the maximum diameter of the rib or ribs and that the inner diameter of the second tubular member is less than the outer diameter of the first tubular member adjacent to the rib or ribs. The second tubular member can constitute a flexible hose, and the first tubular member can constitute a piece or a portion of a metallic or plastic pipe or tube.

The circumferentially complete portion of the substantially sleeve-like clamping device can be disposed in the region of the first free end and, if the first free end is spaced apart from the rib or ribs, the clamping device tightly surrounds that portion of the first tubular member which is disposed between the first free end and the nearest rib to prevent the penetration of a fluid into the space between such portion of the first tubular member and the internal surface of the second tubular member.

The U-shaped end portions of the prongs include inner legs which are disposed between the internal surface of the second tubular member and the external surface of the first tubular member and which are preferably in large-area contact with the external surface of the first tubular member to thus establish a frictional engagement which contributes to retention of the second tubular member on the first tubular member by reducing the likelihood of the clamping device slipping off the first tubular member. At least some of the prongs can be provided with creases in the region of the second free end; such creases maintain the adjacent portions of the material of the second tubular member in deformed condition and enhance the clamping action of the sleeve-like clamping device upon the second tubular member. Each of the prongs can be provided with at least one crease. The force with which the clamping device is held on the second tubular member can be increased by vulcanizing the second tubular member to the clamping device.

The internal surface of the clamping device can be provided with protuberances which deformingly engage the second tubular member. Such protuberances can be provided on the circumferentially complete portion and/or on the prongs of the clamping device. The protuberances can together constitute two circumferentially extending annular protuberances provided at the inner sides of the prongs and flanking the rib or ribs of the first tubular member. At least some of the protuberances can constitute reinforcements for the elastic prongs of the clamping device. Reinforcing projections can be provided at the outer sides of the prongs (i.e., at the sides facing outwardly and away from the second tubular member) and can constitute elongated stiffening ribs extending in parallelism with the axis of the clamping device. Each of the prongs can be provided with at least one stiffening rib.

The rib or ribs on the first tubular member can have inner sides (namely, those sides which face away from the free end of the first tubular member) which slope radially inwardly toward the second free end, namely, toward the non-raised part of the external surface on the first tubular member. The tips of the U-shaped portions of prongs on the clamping device can abut against the nearest rib on the first tubular member. The width of the slots which separate the prongs of the clamping device from one another can be a small fraction of the width of the prongs, as considered in the circumferential direction of the clamping device. The width of compartments which are defined by the U-shaped end portions of the prongs and which receive that part of the second tubular member which is formed with the second free end can be constant; however, such width can be caused to decrease, at least in the regions of open ends of the compartments, in response to the application of axial stresses upon the second tubular member and/or upon the clamping device in a direction to tend to separate the second tubular member and/or the clamping device from the first tubular member, namely, when the tips of inner legs of the U-shaped end portions of the prongs begin to slide along the respective side of the nearest rib on the first tubular member. If the first tubular member has several external ribs, the outermost rib can (but need not) be immediately adjacent to the free end of the first tubular member.

The novel features which are considered as characteristic of the invention are set forth in particular in the appended claims. The improved sleeve coupling itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
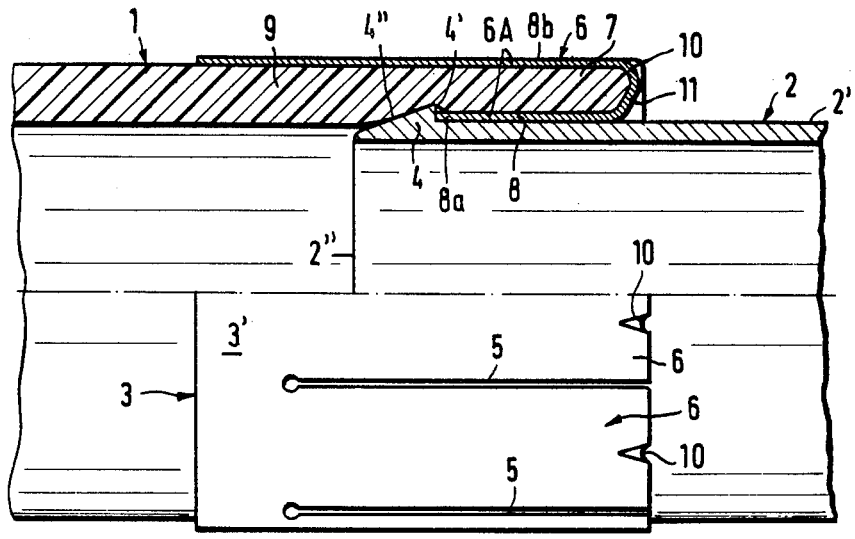
FIG. 1 is a partly elevational and partly axial sectional view of a sleeve coupling which embodies one form of the invention.

The sleeve coupling which is shown in FIG. 1 comprises an at least substantially rigid first tubular member 2 (hereinafter called tube) which consists of a suitable metallic material and can constitute a nipple, an at least slightly deformable second tubular member 1 (hereinafter called hose) which consists of a suitable elastomeric synthetic plastic material, and a tubular clamping member 3 (hereinafter called sleeve) which consists of sheet metal and includes a circumferentially complete tubular portion 3' as well as a second tubular portion consisting of an annulus of axially parallel elastic prongs 6 alternating with relatively narrow slots 5. The material of the hose 1 is preferably a synthetic thermoplastic substance, such as EDPM (ethylene-propylene-therpolymer). The illustrated tube 2 consists of a metallic material; however, it is equally within the purview of the invention to use a tube which consists of or contains a synthetic thermoplastic substance. The external surface 2' of the tube 2 is formed with a circumferentially complete outwardly extending rib 4 which slopes gradually radially inwardly toward the free end 2" of the tube 2 and which is further formed with a radially extending annular shoulder 4' facing away from the free end 2".

The sleeve 3 is made of spring steel or an analogous resilient material and its slots 5 are preferably equidistant from one another, as considered in the circumferential direction of the surface 2'The slots 5 extend all the way to the free end of the sleeve 3, i.e., all the way to the radial shoulder 4' which is engaged by the end portions 8a of the U-shaped right-hand end portions 6A of the prongs 6. It can be said that the sleeve section which includes the prongs 6 constitutes a radially expansible collar which bears against the external surface of the hose 1 in the region of the rib 4 as well as in the region between the rib 4 and the free end 7 of the hose 1. Each of the U-shaped portions 6A has an inner leg 8 which is disposed between the hose 1 and the tube 2, and an outer leg 8b which is adjacent to the external surface of the hose 1 and is parallel or nearly parallel to the inner leg 8. The latter has a tip (the aforementioned end portion 8a) which abuts against the shoulder 4' of the rib 4. That portion of the hose 1 which defines and is adjacent to the free end 7 is reliably clamped between the inner and outer legs 8 and 8b of the U-shaped portions 6A. It will be noted that the inner sides or surfaces of inner legs 8 of the U-shaped portions 6A are relatively large so that each such inner leg is in large-area contact with the external surface 2' of the tube 2 in the region which is disposed to the right of the shoulder 4' on the rib 4.

The circumferentially complete portion 3' of the clamping sleeve 3 is located to the left of the free end 2", i.e., it surrounds a portion 9 of the hose 1 which does not surround the tube 2.

At least some of the U-shaped portions 6A are formed with creases 10 which extend into and deform the adjacent parts of the hose 1 in the region of its free end 7. In the embodiment of FIG. 1, each U-shaped portion 6A is formed with at least one crease 10. As can be seen in the lower part of FIG. 1, the creases 10 constitute dents or analogous depressions in the outer sides of outer legs 8b of the U-shaped end portions 6A and the formation of such creases entails depression of the material of the prongs 6 at the inner sides of the outer legs 8b (as well as at the inner sides of the webs 11 between the inner legs 8 and outer legs 8b of the end portions 6A) into the space between the annulus of inner legs 8 and the annulus of outer legs 8b. The creases 10 contribute to rigidity of the webs 11 between the inner and outer legs 8 and 8b of the U-shaped end portions 6A.

If the passage which is surrounded by the tube 2 and hose 1 contains or conveys a pressurized fluid, the pressure of fluid causes radial expansion or bloating of the hose 1 in the region to the left of the sleeve 3, as viewed in FIG. 1. In the absence of the sleeve 3, such expansion of the hose 1 would progagate itself toward the free end 7 to permit escape of fluid along the external surface 2' of the tube 2 and to eventually result in total separation of the parts 1 and 2 from one another. Such separation would be attributable to the axial component of the force which is generated by the pressurized fluid and acts against the internal surface of the hose 1.

An advantage of the circumferentially complete annular portion 3' of the sleeve 3 is that it prevents radial expansion of the portion 9 of the hose 1 in the region to the left of the free end 2" of the tube 2, i.e., such radial expansion cannot propagate itself all the way to and beyond the rib 4 (namely, into the region of the external surface 2' of the tube 2). Even if the hose 1 is flexed by external radial forces acting upon the hose in a region close to the sleeve 3, the resulting radially outwardly directed component of forces acting upon the inner side of the bent portion of the hose 1 cannot be felt all the way to the rib 4 so that such component, which develops as a result of flexing of the hose 1 cannot adversely affect the sealing action between the hose and the tube 2. In fact, the pressure of fluid in the passage which is defined by the hose 1 and tube 2 causes the hose to bear against the circumferentially complete tubular portion 3' of the sleeve 3 with a force which increases proportionally with a rise of fluid pressure. This entails a corresponding increase of frictional forces acting between the inner side of the sleeve 3 and the outer side of the portion 9 of the hose 1 so that the hose is securely held against axial movement relative to the tube 2 and sleeve 3. The latter is locked to the tube 2 because the tips 8a of the inner legs 8 of its U-shaped end portions 6A abut against the radial shoulder 4' of the rib 4, i.e., the sleeve 3 is held against any movement in a direction to the left, as viewed in FIG. 1, as soon as the tips 8a of the inner legs 8 expand sufficiently to move against the shoulder 4a. The clamping action of U-shaped end portions 6A of the prongs 6 upon the right-hand end portion of the hose 1 (in the region of the free end 7) contributes significantly to retaining action of the sleeve 3 upon the hose 1, i.e., such clamping action assists the frictional forces acting between the external surface of the hose portion 9 and the internal surface of the tubular portion 3' to ensure highly reliable retention of the hose 1 in the illustrated axial position against the action of very pronounced internal pressures and/or in spite of pronounced and repeated flexing of the hose. The purpose of the slots 5 is to facilitate some radial expansion of the tubular body which is formed by the elastic prongs 6 so that such body can be readily slipped onto the external surface 2' of the tube 2 to the extent which is necessary to enable the tips 8a of the inner legs 8 to move radially inwardly and to engage the shoulder 4' of the rib 4. The webs 11 between the inner legs 8 and the outer legs 8b of the U-shaped end portions 6A of the prongs 6 are preferably inclined in a manner as shown in the upper right-hand portion of FIG. 1 so as to further facilitate the application of the sleeve 3 and of the end portion of hose 1 onto the external surface 2' of the tube 2. The inclined outer sides of the webs 11 slide over the complementary or substantially complementary outer side 4" of the rib 4. The outer side 4" slopes radially inwardly toward the free end 2" of the tube 2. The material of the prongs 6 is sufficiently elastic to enable such prongs to yield while their end portions 6A ride over the rib 4, whereupon the prongs reassume their normal positions to thereby move the inner sides of the legs 8 against the external surface 2' and to cause the tips 8a of the legs 8 to move radially inwardly and against the shoulder 4' as soon as the inner legs 8 advance beyond the crest or maximum-diameter portion of the rib 4. The normal positions of the prongs 6 (in unstressed condition of the sleeve 3) are preferably such that they cause the inner legs 8 to bear against the external surface 2' to thus further reduce the likelihood of accidental or even forcible separation of the unit including the sleeve 3 and hose 1 from the tube 2. Thus, that portion of the hose 1 which includes the free end 7 is biased radially inwardly toward the external surface 2' of the tube 2. The just discussed mode of prestressing the prongs 6 is desirable and advantageous on the additional ground that more or less permanent deformation of the hose 1 as a result of excessive heating or aging of its material cannot entail an immediate or abrupt separation of the hose from the sleeve 3 and/or of the sleeve 3 from the tube 2. Such aging or deformation as a result of overheating results in a certain amount of radially inward movement of the hose 1 toward the tube 2, especially in the region of the rib 4. When the hose 1 is not stressed, i.e., when the pressure of fluid which fills the passage within the tube 2 and the hose 1 decreases, the hose 1 can be separated from the sleeve 3 in response to exertion of a sufficiently pronounced axially oriented force acting in a direction to the left, as viewed in FIG. 1 and tending to extract the right-hand end portion of the hose from the compartments within the U-shaped end portions 6A. The sleeve 3 can be separated from the tube 2 in a next-following step by the simple expedient of forcibly expanding the tips 8a of or the entire inner legs 8 so that they can be slipped over the rib 4 in a direction to the left, as viewed in FIG. 1.

An important advantage of the improved sleeve coupling is that the sleeve 3 surrounds the hose 1 all the way from a region at the left-hand or outer side of the rib 4 to the free end 7. This ensures that the circumferentially complete sleeve portion 3' prevents expansion of the hose 1 at the outer side of the rib 4 while the U-shaped end portions 6A of the prongs 6 clamp the hose portion which is inwardly adjacent to the rib, namely, that portion of the hose which includes the free end 7. Thus, the engagement between the sleeve 3 and the hose 1 is continuous all the way from a locus at the left-hand side of the rib 4 and to the free end 7. Consequently, the sleeve 3 is in a large-area contact with the hose 1 (not only with the external surface of the hose but also with its internal surface, namely, in the regions where the inner legs 8 are overlapped by the internal surface of the hose 1). As stated above, frictional engagement between the hose 1 and the internal surface of the circumferentially complete annular portion 3' of the sleeve 3 becomes more pronounced with increasing pressure of fluid which is confined in the interior of the tubular members 1 and 2. This, in combination with direct engagement between the inner sides of the legs 8 and the external surface 2' of the tube 2, as well as in combination with direct engagement between the tips 8a of the inner legs 8 and the shoulder 4' of the rib 4, ensures that the improved sleeve coupling can withstand stresses which would immediately entail complete separation of the tubular members in a conventional sleeve coupling. As also mentioned above, the circumferentially complete annular portion 3' further serves to prevent separation of the internal surface of the hose 1 from the external surface of the tube 2 in response to externally induced bending or flexing of the hose because the propagation of such flexing or bending toward the rib 4 is prevented by the portion 3' which is outwardly adjacent to the free end 2" of the tube 2. Moreover, such positioning of the portion 3' at the outer side of the free end 2" greatly reduces the likelihood of leakage of confined fluid between the internal surface of the hose 1 and the external surface 2' of the tube 2.

Figure 2:
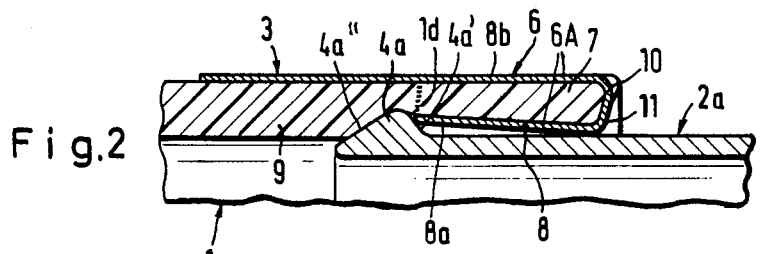
FIG. 2 is a fragmentary axial sectional view of a second sleeve coupling wherein the inner side of the rib slopes radially inwardly.

FIG. 2 illustrates a portion of a modified sleeve coupling with a tube 2a having a rib 4a flanked by two inclined surfaces 4a' and 4a". In their positions which are shown in FIG. 2, the inner legs 8 of the U-shaped end portions 6A of the prongs 6 forming part of the sleeve 3 are not parallel with the respective outer legs 8b, and the tips 8a of the inner legs 8 abut against the crest or maximum-diameter portion of the rib 4a. Under certain circumstances which will be described below, this ensures the establishment of an even more pronounced clamping action upon that portion of the hose 1 which is confined by the U-shaped end portions 6A so that the likelihood of accidental separation of the hose 1 from the sleeve 3 is even more remote.

The coupling of FIG. 2 exhibits the following advantages: Since the frictional engagement between the hose 1 and the sleeve 3 is very pronounced, an increase of fluid pressure in the passage defined by the tube 2 and hose 1 shown in FIG. 1 beyond a certain acceptable value is likely to entail a pivoting of U-shaped end portions 6A about the radial surface or shoulder 4' of the rib 4 (in a counterclockwise direction, as viewed in the upper part of FIG. 1) with resultant movement of inner surfaces of the inner legs 8 away from the external surface 2' of the tube 2. Such pivoting of the U-shaped end portions 6A with reference to the shoulder 4' of the rib 4 takes place before the pressure of fluid causes the hose 1 to become separated from the sleeve 3 of FIG. 1. Pivoting of the inner legs 8 relative to the radial shoulder 4' causes at least some expansion of the U-shaped end portions 6A of FIG. 1, i.e., the clamping action of inner and outer legs 8, 8b of the end portions 6A upon the right-hand end portion of the hose 1 decreases. In other words, the state of parallelism between the inner legs 8 and the outer legs 8b of the U-shaped end portions 6A shown in FIG. 1 is terminated (i.e., the distance between the free ends or tips 8a of the inner legs 8 and the outer legs 8b of the respective U-shaped end portions 6A increases beyond that shown in FIG. 1 so that the inner and outer legs 8, 8b of the portions 6A make acute angles); this entails a reduction of retaining forces acting upon the hose 1 so that the magnitude of the force which is needed to extract the hose 1 from the sleeve 3 of FIG. 1 decreases with progressing pivoting of inner legs 8 relative to the radial shoulder 4' of the rib 4.

In the coupling of FIG. 2, a rise of fluid pressure in the passage defined by the tube 2a and hose 1 causes the tips 8a of the inner legs 8 to slide along the sloping side or surface 4a, of the rib 4a toward the positions shown in FIG. 2 for one of the inner legs 8. The result is that the distance between the tips 8a and the corresponding outer legs 8b decreases so that the clamping action of the U-shaped end portions 6A upon the right-hand end portion of the hose 1 increases with increasing fluid pressure in the tube 2a and hose 1. FIG. 2 shows the tips 8a in positions they assume in response to a very pronounced rise of pressure in the parts 1 and 2a, i.e., the tips 8a are close to the crest of the rib 4a. In other words, whereas the clamping action of U-shaped end portions 6A shown in FIG. 1 is likely to decrease in the regions of free ends or tips 8a of the inner legs 8, the situation is just the reverse in FIG. 2 wherein the material of the hose 1 is subjected to an increasing clamping action (in the region 1d denoted by dots) when the pressure of fluid in the parts 1 and 2a of FIG. 2 rises to such an extent that the inner legs 8 begin to slide along the side 4a' of the rib 4a. Therefore, the embodiment of FIG. 2 is especially suited for use in pipelines wherein the pressure of fluid is likely to rise to a high or very high value.

Figures 3, 4:
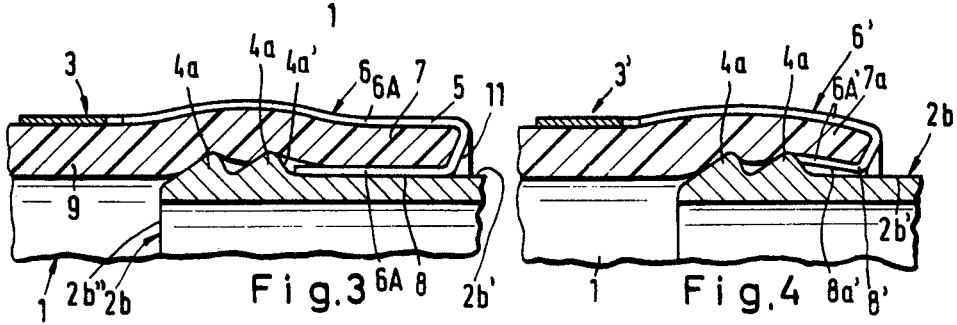
FIG. 3 is a fragmentary axial sectional view of a third sleeve coupling with two ribs at the exterior of the first tubular member.
FIG. 4 is a fragmentary axial sectional view of a fourth sleeve coupling which constitutes a modification of the coupling shown in FIG. 3.

FIG. 3 illustrates a portion of a third sleeve coupling with a tube 2b having two circumferentially complete ribs 4a of the type described in connection with FIG. 2. The left-hand rib 4a is closely or immediately adjacent to the free end 2b'' of the tube 2b. An advantage of two ribs 4a is that the material of the hose 1 penetrates into the annular groove between the two ribs under the clamping action of the surrounding part of the sleeve 3 so that such design further contributes to reliable retention of the hose 1 on the tube 2b. The internal bead of the hose 1 in the groove between the two ribs 4a not only enhances the resistance of the hose 1 to axial movement relative to the tube 2b but it also contributes to a more reliable and longer-lasting sealing action, i.e., the bead reduces the likelihood of penetration of confined fluid into the regions of contact between the external surface 2b' and the inner legs 8 of the U-shaped end portions 6A.

FIG. 4 shows a fourth sleeve coupling which is practically or substantially identical with the coupling of FIG. 3. The only important difference is that the inner legs 8' of the U-shaped end portions 6A' of prongs 6' forming part of the sleeve 3' are shorter than the inner legs 8 shown in FIG. 3. If the inner legs 8' are as short as shown in FIG. 4, the clamping action of the U-shaped end portions 6A' upon the corresponding end portion 7a of the hose 1 is not very pronounced and, moreover, the initial stressing of the end portions 6A' might not suffice to ensure that the inner sides of the inner legs 8' are moved all the way into full surface-to-surface contact with the external surface 2b' of the tube 2b. Therefore, a relatively small axially directed force can suffice to flex the tips 8a' of the inner legs 8' radially outwardly so that the tips 8a' slide over the right-hand rib 4a. In fact, such axial shifting of the sleeve 3' would be likely to take place even if the right-hand rib 4a of FIG. 4 were replaced with a rib 4 of the type shown in FIG. 1, i.e., with a rib having a radial shoulder 4' facing the tips of the inner legs. If the length of inner legs is more pronounced (as shown in FIG. 3), the likelihood of premature and excessive radially outwardly directed movement of the tips of inner legs is greatly reduced or prevented in its entirety.

It will be noted that it is advisable to select the axial length of U-shaped end portions 6A (and especially the axial length of the inner legs, 8) in such a way that the inner sides of the legs 8 are in large-area contact with the external surface 2b' of the tube 2b. This ensures that frictional engagement between the legs 8 and the external surface of the tube also contributes to retention of the unit including the sleeve 3 and hose 1 on the tube 2b. Moreover, this ensures that the tips 8a of the inner legs 8 engage the nearest rib 4a close to the root or radially innermost portion of the respective side 4a' with the aforediscussed beneficial results i.e., with a greatly reduced likelihood of rapid slippage of tips 8a over the neighboring rib 4a in response to the application of axial stresses to the hose 1 and/or sleeve 3. The provision of aforediscussed creases 10 contributes to stiffening of the U-shaped end portions 6A, especially in the regions of their webs 11, to thus further enhance the clamping action upon the confined end portion of the hose 1 and to further reduce the likelihood of opening of the U-shaped end portions 6A during engagement of their tips 8a with the nearest rib 4 or 4a while a pull is exerted upon the sleeve 3 and/or hose 1 in a direction to draw the hose off the tube 2 or 2a.

Figure 5:
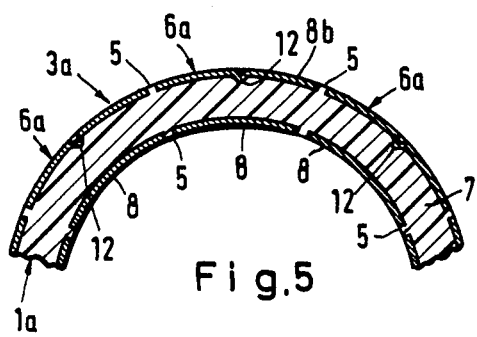
FIG. 5 is a fragmentary transverse sectional view of a fifth sleeve coupling wherein the prongs of the sleeve have inwardly extending protuberances.

Referring to FIG. 5, there is shown a sleeve coupling wherein the tube is omitted for the sake of clarity. The prongs 6a of the sleeve 3a are provided with radially inwardly extending protuberances 12 in the form of elongated ribs extending in parallelism with the axis of the sleeve 3a. Each prong 6a can be provided with one or more protuberances 12, or such protuberances can be provided one certain prongs 6a. The protuberances 12 are provided in the outer legs 8b of the prongs 6a, namely, in those portions of the prongs which surround the hose 1a. Each such protuberance can be formed by depressing radially inwardly the corresponding portions of the outer legs 8b of the prongs 6a, i.e., by forming such outer sides with longitudinally extending grooves with resort to a suitable deforming technique. The purpose of the protuberances 12 is to enhance the springy rigidity or resistance to deformability of the prongs 6a, i.e., to further enhance the retaining action of the sleeve 3a upon the hose 1a. The latter is vulcanized into the sleeve 3a so that the elastomeric material of the hose 1a penetrates into the slots 5 between the neighboring prongs 6a. This enhances the axial stability of the unit including the parts 1a and 3a, i.e., the hose is even less likely to become accidentially separated from the sleeve. Vulcanizing of the hose 1a to the sleeve 3a establishes a form-locking connection between such parts which contributes significantly to prevention of accidental separation of the sleeve 3a from the hose 1a and/or of the sleeve 3a or hose 1a from the tube. Vulcanizing of the hose 1a to the sleeve 3a, especially in combination with the provision of the aforediscussed protuberances 12 or analogous reinforcing means, renders accidental or even forcible separation of the parts 1a and 3a from one another highly unlikely and thus enhances the safety and reliability of the coupling which utilizes such parts. The protuberances 12 extend into the space which is allotted for the hose 1a and contribute to the clamping action of the sleeve 3a upon the hose.

Figure 6:
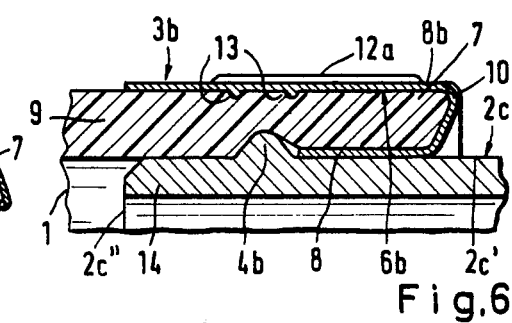
FIG. 6 is a fragmentary axial sectional view of a sixth sleeve coupling wherein the prongs have internal protuberances as well as external stiffening projections.

FIG. 6 shows a portion of a sleeve coupling wherein the outer legs 8b of U-shaped end portions of the prongs 6b are formed with radially outwardly extending solid projections 12a in the form of elongated axially parallel stiffening ribs which enhance the rigidity of the respective outer legs. The projections 12a may but need not be formed by bending the material of the outer legs 8b radially outwardly from the inside, i.e., it is possible and often preferred to form the projections 12a by adding material at the outer sides of some or all of the outer legs 8b of U-shaped end portions of the prongs 6b.

The inner sides of outer legs 8b of the U-shaped end portions of prongs 6b are formed with pairs of radially inwardly extending protuberances 13 which penetrate into and deformingly engage the adjacent parts of the hose 1. The protuberances 13 are disposed at the opposite sides of the rib 4b which extends from the external surface 2c' of the tube 2c. The protuberances 13 extend circumferentially of the hose 1, i.e., transversely of the outer legs 8b of U-shaped end portions of the prongs 6b. The protuberances 13 can be solid, i.e., they can be formed by adding material to the inner sides of the outer legs 8b. The rib 4b of the tube 2b has a substantially semicircular cross-sectional outline and is spaced apart from the free end 2c", i.e., a circumferentially complete cylindrical portion 14 of the tube 2c is disposed between the free end 2c" and the rib 4b. The free end 2c" is in register or in near register with the left-hand end of the sleeve 3b. The axial length of the sleeve 3b can match that of the sleeve 3 shown in FIG. 1, i.e., the length of the tube 2c shown in FIG. 6 can exceed the length of the tube 2 shown in FIG. 1 by the length of the portion 14 which then approximates the distance between the free end 2" and the left-hand axial end of the sleeve 3 shown in FIG. 1.

An advantage of the portion 14 of the tube 2c shown in FIG. 6 is that it counteracts the tendency of the hose 1 to flex away from the inner side of the sleeve 3b in response to the application of external bending stresses to the hose 1 in the region to the left of the sleeve 3b. Thus, the application of the just discussed external stresses cannot reduce the magnitude of frictional forces acting between the internal surface of the sleeve 3b and the external surface of the hose 1. Such advantage is achieved without reducing the retaining action of the sleeve 3b when the pressure of fluid in the interior of the hose 1 and tube 2c increases. In fact, frictional forces acting between the sleeve 3b and the hose 1 of FIG. 6 increase in response to increasing fluid pressure because the fluid which happens to penetrate between the portion 14 of the tube 2c and the inner side of the hose 1 urges the outer side of the hose against the internal surface of the sleeve 3b.

It goes without saying that the sleeve 3b can extend to the left and beyond the free end 2c" of the tube 2c. Such a coupling even further reduces the likelihood of influence of external bending or flexing stresses upon the frictional engagement between the parts 1 and 2c, i.e., the fluid is even less likely to penetrate between the external surface of the portion 14 and the internal surface of the adjacent portion 9 of the hose 1.

The protuberances 13 not only enhance the clamping action of the sleeve 3b upon the hose 1 (i.e., the form-locking connection between the parts 1 and 3b) but they also contribute to a more pronounced retaining action of the tube 2c upon the hose 1 because the protuberances 13 urge the internal surface of the hose against the adjacent portions of the external surface of the tube 2c. Moreover, the protuberances 13 cause the internal surface of the hose 1 to bear against the crest as well as against both sides of the rib 4b to thereby further reduce the likelihood of slippage of the hose axially of the tube 2c in response to the application of internal or external deforming stresses against the hose in a region to the left of the sleeve 3b.

The ribs 12a not only promote the resistance of elastic prongs 6b to a deformation which would result in a reduction of clamping action upon the confined end portion of the hose 1 but they also contribute to the ability of prongs 6b to reassume their optimum positions as soon as the coupling is fully assembled, i.e., as soon as the end portions or tips of the inner legs 8 are located to the right of the rib 4b so that the inner sides of the legs 8 can move into large-area contact with the external surface 2c' of the tube 2c.

The improved sleeve coupling is susceptible of many additional modifications without departing from the spirit of the invention. For example, the clamping sleeve 3 of FIG. 1, 2 or 3 can also be provided with external and or internal reinforcing or stiffening projections or protuberances in the form of ribs or the like (such as the parts 12, 12a and 13). Furthermore, the tube 2, 2a or 2b can also include a tubular extension corresponding to the portion 14 of the tube 2c shown in FIG. 6. The sleeve can be made of sheet metal or of a suitable synthetic plastic material. Furthermore, the hose can be made of a wide variety of synthetic thermoplastic substances (such as EPDM or polyvinyl chloride) as well as of natural rubber.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling comprising an at least substantially rigid first tubular member having a first free end and an external surface provided with at least one circumferentially extending rib; an at least partially deformable second tubular member surrounding said surface and having a second free end, said rib being disposed between said free ends and being spaced apart from said second free end; and a clamping device for holding said tubular members together, said device including a circumferentially complete tubular portion tightly surrounding said second member and an annulus of elastic prongs at least substantially parallel to the axis of said first member and surrounding said second member in the region of said rib as well as between said rib and said second free end, said prongs having end portions confining and clampingly engaging said second member in the region of said second free end and said end portions inluding legs disposed between said tubular members and being in contact with said external surface, said rib being disposed between said circumferentially complete tubular portion and said second free end, as considered in the axial direction of said first tubular member, and said legs contacting said external surface between said rib and said second free end.

2. The coupling of claim 1, wherein said second tubular member is a flexible hose.

3. The coupling of claim 1, wherein said rib is a circumferentially complete rib extending radially outwardly from said external surface, said second member respectively having outer and inner diameters which, in undeformed condition of said second member, are respectively larger than the maximum diameter of said rib and smaller than the outer diameter of said first member adjacent said rib.

4. The coupling of claim 1, wherein said circumferentially complete tubular portion is located in the region of said first free end and said clamping device tightly surrounds said second member in the region between said first free end and said rib.

5. The coupling of claim 1, wherein said legs are in large-area contact with said external surface.

6. The coupling of claim 1, wherein at least some of said prongs have creases provided in the region of said second free end and maintaining the adjacent portions of the material of said second member in deformed condition.

7. The coupling of claim 6, wherein each of said prongs has at least one crease.

8. The coupling of claim 1, wherein said clamping device has an internal surface provided with protuberances deformingly engaging said second tubular member.

9. The coupling of claim 8, wherein said protuberances include a first substantially annular protuberance at one side and a second substantially annular protuberance at the other side of said rib.

10. The coupling of claim 1, wherein at least some of said prongs include reinforcing projections.

11. The coupling of claim 10, wherein said prongs have outer sides facing away from said second tubular member and said reinforcing projections include elongated stiffening ribs extending lengthwise of and disposed at the outer sides of the respective prongs.

12. The coupling of claim 11, wherein each of said prongs has at least one stiffening rib.

13. The coupling of claim 1, wherein said rib has a side facing away from said first free end and sloping radially inwardly toward said second free end.

14. The coupling of claim 1, wherein said end portions of said prongs have tips which abut against said rib.

15. The coupling of claim 1, wherein said clamping device and said first tubular member consist of a metallic material and said second tubular member consists of a synthetic plastic material.

16. The coupling of claim 1, wherein said clamping device has slots alternating with said prongs and the width of said slots, as considered in the circumferential direction of said second tubular member, is a fraction of the width of said prongs.

17. The coupling of claim 1, wherein said end portions of said prongs define compartments whose width, as considered in the radial direction of said second tubular member, is at least substantially constant.

18. The coupling of claim 1, wherein said first tubular member has several ribs including a rib which is at least closely adjacent said first free end.

19. A coupling comprising an at least substantially rigid first tubular member having a first free end and an external surface provided with at least one circumferentially complete rib extending radially outwardly from said external surface; an at least partially deformable second tubular member surrounding said surface and having a second free end, said rib being disposed between said free ends and being spaced apart from said second free end, said second tubular member respectively having outer and inner diameters which, in undeformed condition of said second member, are respectively larger than the maximum diameter of said rib and smaller than the outer diameter of said first tubular member adjacent to said rib; and a clamping device for holding said tubular members together, said device including a circumferentially complete tubular portion tightly surrounding said second member and an annulus of elastic prongs at least substantially parallel to the axis of said first member and surrounding said second member in the region of said rib as well as between said rib and said second free end, said prongs having end portions confining and clampingly engaging said second member in the region of said second free end and said prongs also contacting said external surface between said rib and said second free end.

20. A coupling comprising an at least substantially rigid first tubular member having a first free end and an external surface provided with at least one circumferentially extending rib; an at least partially deformable second tubular member surrounding said surface and having a second free end, said rib being disposed between said free ends and being spaced apart from said second free end and in contact with said second tubular member; and a clamping device for holding said tubular members together, said device including a circumferentially complete tubular portion tightly surrounding said second member and an annulus of elastic prongs at least substantially parallel to the axis of said first member and surrounding said second member in the region of said rib as well as between said rib and said second free end, said prongs having end portions confining and clampingly engaging said second member in the region of said second free end and contacting the external surface of said first tubular member, said device being vulcanized to said second tubular member.

* * * * *